United States Patent [19]

Schuelke et al.

[11] Patent Number: 5,293,968
[45] Date of Patent: Mar. 15, 1994

[54] DUAL-TUBE SHOCK ABSORBER

[75] Inventors: Armin Schuelke, Schwieberdingen; Kurt Engelsdorf, Besigheim; Karl-Heinz Haegele, Vaihingen/Enz, all of Fed. Rep. of Germany

[73] Assignee: Robert Bosch GmbH, Stuttgart, Fed. Rep. of Germany

[21] Appl. No.: 977,991

[22] Filed: Nov. 18, 1992

[30] Foreign Application Priority Data

Dec. 3, 1991 [DE] Fed. Rep. of Germany ....... 4139821

[51] Int. Cl.$^5$ .............................. F16F 9/18; F16F 9/34; B60G 15/08
[52] U.S. Cl. ..................................... 188/282; 188/317
[58] Field of Search ............... 188/287, 282, 285, 286, 188/287, 299, 317, 319, 315, 322.22; 267/127

[56] References Cited

U.S. PATENT DOCUMENTS

| 2,173,574 | 9/1939 | Binder et al. | 188/287 |
| 3,824,874 | 3/1962 | De Koning et al. | 188/286 |
| 4,732,408 | 3/1988 | Ohlin | 188/299 X |

FOREIGN PATENT DOCUMENTS

| 0261427 | 3/1988 | European Pat. Off. | |
| 3632562 | 4/1988 | Fed. Rep. of Germany | |
| 3800678 | 7/1989 | Fed. Rep. of Germany | 188/267 |
| 1063264 | 4/1954 | France | 188/317 |

*Primary Examiner*—Andres Kashnikow
*Assistant Examiner*—Josie A. Ballato
*Attorney, Agent, or Firm*—Edwin E. Greigg; Ronald E. Greigg

[57] ABSTRACT

A dual-tube shock absorber having a damping piston, which is joined to a vehicle body via a piston rod; an inner cylinder, guiding the damping piston, that is disposed in an outer cylinder which is connected to the vehicle axle and that together with the damping piston encloses an upper and a lower liquid-filled pressure chamber; a check valve which enables a liquid flow from an compensation chamber enclosed by the outer and inner cylinders to the lower pressure chamber; and a line, joining the upper pressure chamber to the compensation chamber, in which line a device is disposed that effects the damping of the shock absorber and is preferably electrically adjustable. To assure a long service life of the device, which is preferably embodied as a throttle valve, and to facilitate the laying of control cables, the line is extended through the damping piston, and the device is integrated with the damping piston.

21 Claims, 2 Drawing Sheets

DUAL-TUBE SHOCK ABSORBER

BACKGROUND OF THE INVENTION

The invention is based on a dual-tube shock absorber as defined hereinafter.

In a known dual-tube shock absorber of this type (DE 36 32 562 A1), the connecting line between the upper pressure chamber and the compensation chamber is embodied by a plurality of annular conduits that are concentric with the inner cylinder and extend between it and the compensation chamber; on their upper face end, they communicate with the upper pressure chamber, while on the lower face end, they communicate with the compensation chamber. The walls of the conduits act as electrodes, between which an electrostatic field is generated. If an electrorheological liquid is used as the damping medium, then the flow of liquid can be throttled to a variably strong extent by the electrostatic field, enabling adjustment of the damping action of the shock absorber. Since this dual-tube shock absorber can be installed only in an upright position—that is, in the installed state, the lower pressure chamber must be on the bottom and the upper pressure chamber must be above the lower pressure chamber—the device that is definitive for the damping is coupled to the vehicle axle or to the wheel steering arms.

OBJECT AND SUMMARY OF THE INVENTION

The dual-tube shock absorber according to the invention has an advantage over the prior art that because the device that is definitive for the damping action of the shock absorber is shifted into the piston, it is connected to the vehicle body via the piston rod. This has two substantial advantages. In a conventional version of the device as a throttle valve for normal hydraulic oil, the direct impacts are from the wheel, and only the lesser forces of acceleration of the vehicle body act upon the valve slide of the throttle valve. This substantially lengthens the service life of the throttle valve and hence of the shock absorber. If the throttle valve is also made controllable to set an arbitrary damping, then the electrical lines for controlling the throttle valve, which begin at the vehicle body, can be laid with a very much simpler course than if they had to be extended to the outer cylinder of the shock absorber that is connected to the wheels. The possibility, provided in existing shock absorbers, of selecting an equal-sized flow quantity of fluid in the tension and compression direction through the device (in other words upon extension and retraction of the shock absorber) is preserved in the shock absorber according to the invention.

In a preferred embodiment of the invention, laying the connecting line with the damping device in the damping piston is achieved by providing that in its outer jacket, the piston has a groove, preferably an annular groove, whose axial width is dimensioned such that even upon a maximum piston stroke, it covers an opening in the inner cylinder that leads to the compensation chamber, specifically below the minimum liquid level in that chamber. From the annular groove, piston bores lead to the face of the damping piston defining the upper pressure chamber, and the damping device is disposed in those bores. In the tension and compression stage, the damping device always has a flow through it in the same direction. A reversed flow through the damping device is obtained if in an alternative embodiment of the invention the piston bores beginning at the groove are made to discharge in the axial through conduits provided in the damping piston, specifically in the conduit segment connected to the outlet of the check valve.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
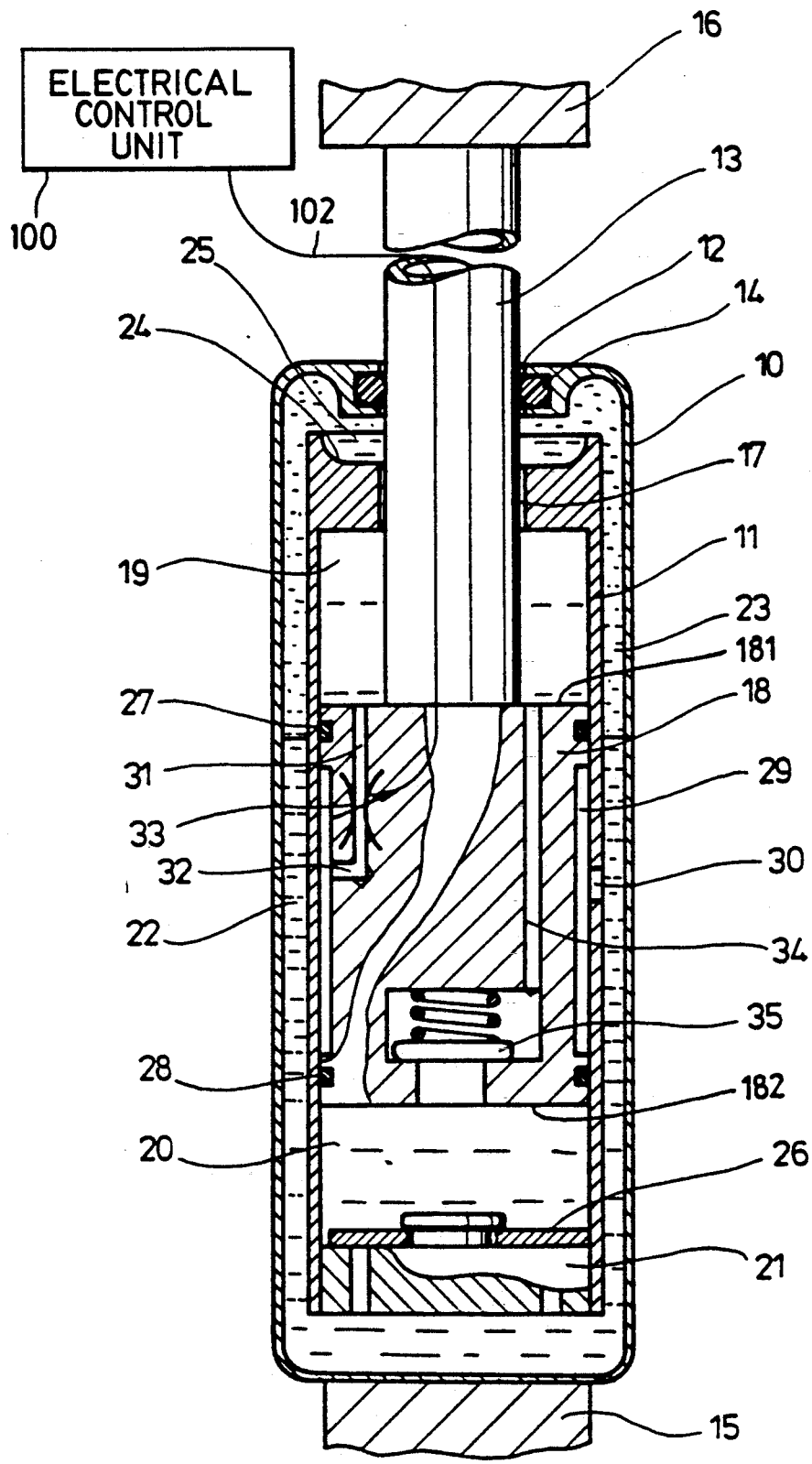
FIG. 1 is a longitudinal section through a dual-tube shook absorber in accordance with a first exemplary embodiment.

The dual-tube shock absorber schematically sketched in longitudinal section in FIG. 1 has an outer cylinder 10, with an inner cylinder 11 disposed concentrically to it. The outer cylinder 10 is closed on all sides, and on its upper face end facing toward the bottom it has a coaxial guide 12 for a piston rod 13. The passage of the piston rod 13 in a liquid-tight and gas-tight manner is assured by means of a sealing ring 14 placed in the guide 12. The outer cylinder 10 is connected toward the bottom with a vehicle axle or a wheel steering arm, suggested in FIG. 1 at 15. On its free end protruding out of the outer cylinder 10, the piston rod 13 is joined to the vehicle body 16. The piston rod 13 passes through an opening 17 in the inner cylinder 11, which opening is coaxial with the guide 12 in the outer cylinder 10, and on its end protruding into the inner cylinder 11 the piston rod has a damping piston 18, which is axially displaceably guided in the inner cylinder 11. The damping piston 18 defines an upper pressure chamber 19 with its upper piston face 181 and a lower pressure chamber 20 with its lower piston face 182. The upper pressure chamber 19 is also defined by the face end of the inner cylinder 11 containing the through opening 17, while the lower pressure chamber 20 is closed off by a bottom plate 21 secured in the inner cylinder 11. Both pressure chambers 19, 20 are filled with liquid, for instance a hydraulic oil. The hollow space enclosed between the outer cylinder 10 and the inner cylinder 11 forms a compensation chamber 22, which is partly filled with the same liquid. A gas cushion 23 is enclosed in the other part of the compensation chamber 22. A recess 24, coaxial with the opening 17, in the end cap of the inner cylinder 11 is filled with a liquid supply 25 that prevents the entry of gas into the upper pressure chamber 19. A check valve 26, which enables the passage of liquid out of the compensation chamber 22 into the lower pressure chamber 20, is disposed in the bottom plate 21.

The damping piston 18 is sealed off from the inner wall of the inner cylinder 11 by two seals 27, 28 axially spaced apart from one another. Between the seals 27, 28, the damping piston 18 has an annular groove 29 on its outer jacket. This annular groove 29 communicates via one or more radial openings 30 in the inner cylinder 11 with the compensation chamber 22. If the damping piston 18 is secured against torsion and if there is an adequate number of openings 30, then instead of the annular groove 29, a longitudinal groove extending in the axial direction may be provided in the outer circumference of the damping piston 18. The openings 30 are located below the liquid level in the compensation chamber 22. A radial blind bore 32 also discharges in the annular groove 29, and discharging into the blind bore in turn is an axial blind bore 31 made from the upper piston face 181 inward, so that the annular groove 29 communicates with the upper pressure chamber 19 via the connecting conduit formed by the two blind bores 31, 32. An electrically adjustable device 33 for adjusting or setting the damping of the shock absorber, symbolically represented here as a throttle, is disposed in the connecting conduit 31, 32. The damping device 33 is embodied as an electrically controllable throttle valve or pressure regulating valve which is controlled by an electrical control unit 100 from which an electrical wire 102 connects with the damping device. The damping piston 18 is also provided with an axial through conduit 34, and a check valve 35 incorporated in the course of this conduit 34 which allows a flow of liquid from the lower pressure chamber 20 to the upper pressure chamber 19.

The mode of operation of the dual-tube shock absorber described is as follows:

Upon spring deflection, that is, retraction, of the shock absorber (compression stage), the damping piston 18 moves downward, and since the check valve 26 in the bottom plate 21 of the inner cylinder 11 is closed, liquid is positively displaced out of the lower pressure chamber 20 into the upper pressure chamber 19, via the opened check valve 35 in the damping piston 18. Although the upper pressure chamber 19 enlarges when the shock absorber retracts, it still cannot hold the entire quantity of fluid, since the piston rod 13 is also extending farther and farther into the upper pressure chamber 19. The excess liquid is forced through the connecting conduit 31, 32, via the damping device 33, into the annular groove 29 of the damping piston 18 and from there flows via the openings 30 into the compensation chamber 22. The damping device 33 through which the liquid flows is the only element in the system that is definitive for the liquid circulation in the shock absorber in the operating range of the compression stage.

Upon extension, or outward spring deflection, of the shock absorber (tension stage), the damping piston 18 moves upward, causing liquid to be positively displaced into the compensation chamber 22, via the connecting conduits 31, 32 and the damping device 33. The upward motion of the damping piston 18 creates suction in the lower pressure chamber 20, causing the check valve 26 in the bottom plate 21 to open. Liquid from the compensation chamber 22 now flows via the opened check valve 26 into the lower pressure chamber 20. Once again, in the system, it is the damping device 33 alone that determines the throttling of the liquid circulation in the shock absorber in the operating range of the tension stage. Both in the compression stage and in the tension stage, the flow through the damping device 33 is in the same direction, that is, being a flow of liquid that is expelled from the upper pressure chamber 19. In designing the axial length of the damping piston 18 and embodying the annular groove 29 on its outer circumference, care must be taken to provide that the opening 30 is covered by the annular groove 29 in every phase of the piston stroke. The annular groove 29 and hence the spacing between the two seals 27, 28 in the damping piston 18 must accordingly be made larger than the maximum stroke of the damping piston 18.

Figure 2:
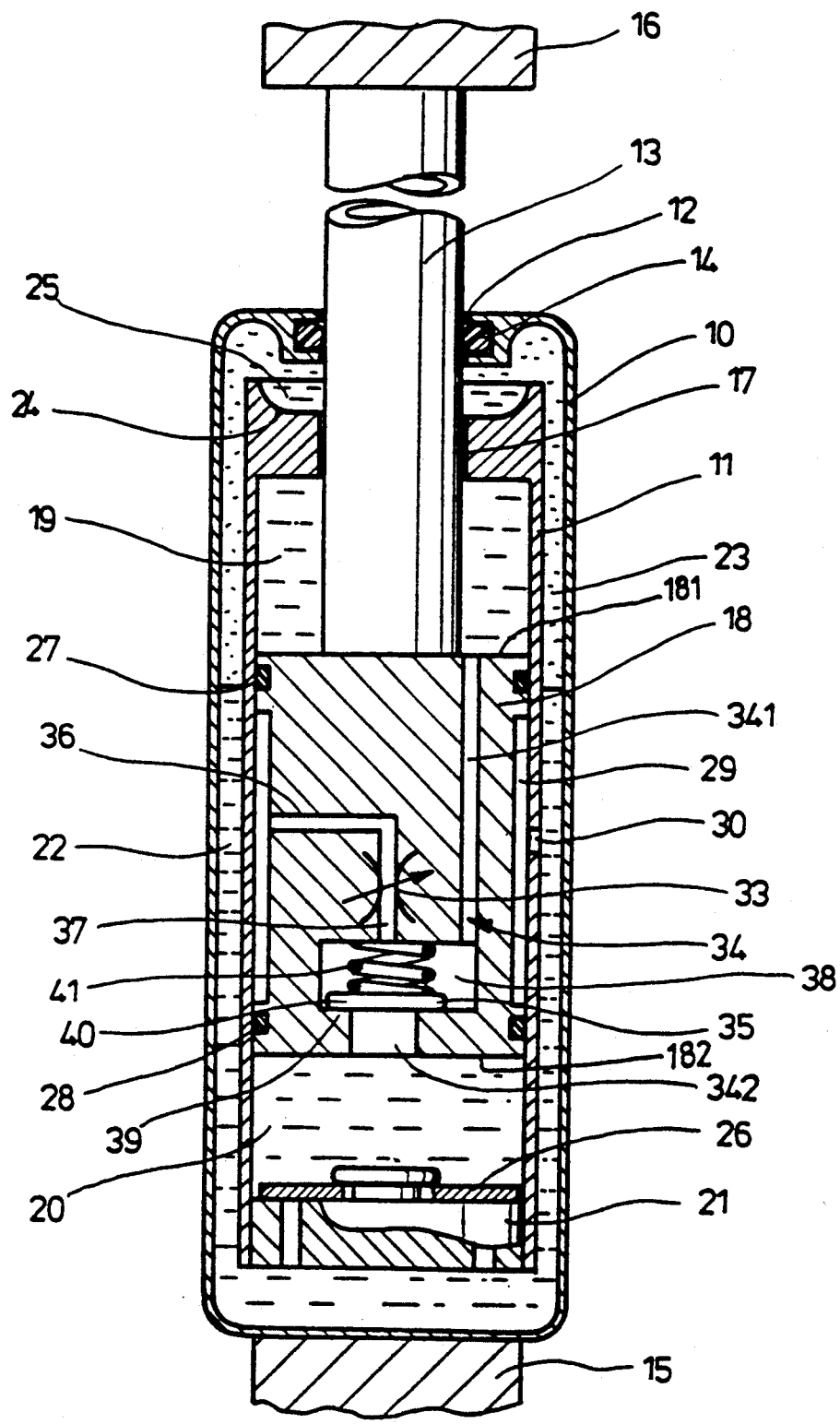
FIG. 2 is a longitudinal section through a dual-tube shock absorber in accordance with a second exemplary embodiment.

The shock absorber sketched in FIG. 2 is modified compared with the above-described shock absorber in the sense that the flow through the damping device 33 is in the reversed direction here. Here, the annular groove 29 communicates with the through conduit 34 in the damping piston 18 via a radial blind bore 36 and an axial blind bore 37. As in FIG. 1, the through conduit 34 is split by a valve chamber 38 of the check valve 35 into two conduit segments 341 and 342, of which the conduit segment 341 establishes communication with the upper pressure chamber 19 and the conduit segment 342 establishes communication with the lower pressure chamber 20. The mouth of the conduit segment 342 in the valve chamber 38 forms the check valve inlet opening, which is surrounded by a valve seat 39. A valve member 40 is held on the valve seat 39 by a valve closing spring 41. The axial bore 37 discharges in the valve chamber 38 on the side opposite the valve inlet opening, but can equally well be extended to the conduit segment 341. It is important merely that the mouth of the bore 37 be located on the outlet side of the check valve 35. The damping device 33 is again disposed in the connecting conduit 36, 37—in this case, in the bore 37.

The mode of operation of this shock absorber is the same as that described above except that here, upon retraction and extension of the shock absorber, the positively displaced liquid always flows through the damping device 33 from the through conduit 34 to the annular groove 29, or in other words precisely in the opposite direction from FIG. 1 in terms of the inlet and outlet of the damping device 33. A prerequisite for this is that when the damping device 33 is designed as a throttle valve or pressure regulating valve, it is disposed in the same installed position in the damping piston 18 in both FIGS. 1 and 2; only the valve connections in terms of the inlet and outlet are transposed.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A dual-tube shock absorber for a vehicle including a vehicle body and vehicle wheels with wheel supports, said dual-tube shock absorber includes an outer cylinder (10) and an inner cylinder (11), a piston rod (13) associated with the vehicle body; said outer cylinder (10) is associated with a vehicle wheel (15); said inner cylinder is retained in the outer cylinder; a damping piston is secured to the piston rod and guided axially displaceably in the inner cylinder, said damping piston separates a liquid-filled upper pressure chamber (19) from a liquid-filled lower pressure chamber (20), the upper pressure chamber (19) is penetrated by the piston rod (13); a partially liquid-filled compensation chamber (22) is located in a spacing between the inner and outer cylinders; a first check valve (26) is disposed in a bottom of the inner cylinder which enables a flow of liquid from the compensation chamber to the lower pressure chamber; a through conduit (34) is in the damping piston, in which conduit a second check valve (35) is placed with a flow direction toward the upper pressure chamber; a connecting line is between the upper pressure chamber and the compensation chamber (22), which connecting line includes a damping device (33) that is definitive for a damping action, the connecting line (31, 32; 36, 37) is arranged in the damping piston (18), and the damping device (33) is disposed in the damping piston (18), the dual-tube shock absorber operates during a retraction stroke by an inward spring deflection, during a compression stage and during an extension stroke by an outward spring deflection, tension stage, the damping device (33) is definitive for the damping action during the retraction stroke and during the extension stroke.

2. A shock absorber as defined by claim 1, in which the damping piston (18) has a groove (29) in an outer jacket face, which groove is dimensioned in an axial direction of the damping piston (18) such that even at a maximum piston stroke, the groove (29) covers an opening (30) in the inner cylinder (11) leading to the compensation chamber (22) at a position below a minimum liquid level of the compensation chamber; and that the connecting line is embodied as piston bores (31, 32; 36, 37), which lead from the groove (29) to a piston face (181) defining the upper pressure chamber (19) or to the through conduit (34) on an outlet side of the second check valve (35).

3. A shock absorber as defined by claim 2, in which the groove is embodied as an annular groove (29).

4. A shock absorber as defined by claim 3, in which the damping device (33) that is disposed in the damping piston (18) and is definitive for the damping action is embodied as a throttle valve.

5. A shock absorber as defined by claim 4, in which the throttle valve is controllable electrically.

6. A shock absorber as defined by claim 3, in which the damping device (33) that is disposed in the damping piston (18) is embodied as a pressure regulating valve.

7. A shock absorber as defined by claim 6, in which the pressure regulating valve is controlled electrically.

8. A shock absorber as defined by claim 2, in which a connecting point of the piston bores (36, 37) and the through conduit (34) is a liquid-filled valve chamber (38) of the second check valve (35).

9. A shock absorber as defined by claim 8, in which the damping device (33) that is disposed in the damping piston (18) and is definitive for the damping action is embodied as a throttle valve.

10. A shock absorber as defined by claim 9, in which the throttle valve is controllable electrically.

11. A shock absorber as defined by claim 8, in which the damping device (33) that is disposed in the damping piston (18) is embodied as a pressure regulating valve.

12. A shock absorber as defined by claim 11, in which the pressure regulating valve is controlled electrically.

13. A shock absorber as defined by claim 2, in which the damping device (33) that is disposed in the damping piston (18) and is definitive for the damping action is embodied as a throttle valve.

14. A shock absorber as defined by claim 13, in which the throttle valve is controllable electrically.

15. A shock absorber as defined by claim 2, in which the damping device (33) that is disposed in the damping piston (18) is embodied as a pressure regulating valve.

16. A shock absorber as defined by claim 15, in which the pressure regulating valve is controlled electrically.

17. A shock absorber as defined by claim 1, in which the damping device (33) that is disposed in the damping piston (18) and is definitive for the damping action is embodied as a throttle valve.

18. A shock absorber as defined by claim 17, in which the throttle valve is controllable electrically.

19. A shock absorber as defined by claim 1, in which the damping device (33) that is disposed in the damping piston (18) is embodied as a pressure regulating valve.

20. A shock absorber as defined by claim 19, in which the pressure regulating valve is controlled electrically.

21. A shock absorber as defined in claim 1, in which a fluid flows through said first and second check valves and said damping device in only one direction.

* * * * *